(12) United States Patent
Nakajima et al.

(10) Patent No.: US 7,228,040 B2
(45) Date of Patent: Jun. 5, 2007

(54) HOLE-ASSISTED SINGLE MODE OPTICAL FIBER

(75) Inventors: Kazuhide Nakajima, Tsukuba (JP); Katsusuke Tajima, Tsukuba (JP); Jian Zhou, Tsukuba (JP); Izumi Sankawa, Kawasaki (JP); Kazuo Hogari, Tokai-mura (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 179 days.

(21) Appl. No.: 10/523,460

(22) PCT Filed: Mar. 30, 2004

(86) PCT No.: PCT/JP2004/004504

§ 371 (c)(1),
(2), (4) Date: Feb. 6, 2005

(87) PCT Pub. No.: WO2004/092793

PCT Pub. Date: Oct. 28, 2004

(65) Prior Publication Data

US 2006/0045448 A1    Mar. 2, 2006

(30) Foreign Application Priority Data

Apr. 17, 2003  (JP) ............................. 2003-113414

(51) Int. Cl.
*G02B 6/032* (2006.01)
*G02B 6/02* (2006.01)

(52) U.S. Cl. ...................................... 385/125; 385/123
(58) Field of Classification Search ................. 385/125
See application file for complete search history.

(56) References Cited

U.S. PATENT DOCUMENTS

| 6,097,870 | A | 8/2000 | Ranka et al. | |
|---|---|---|---|---|
| 6,208,776 | B1 * | 3/2001 | Prohaska et al. | 385/13 |
| 6,400,866 | B2 * | 6/2002 | Ranka et al. | 385/28 |
| 6,512,871 | B2 * | 1/2003 | Kumel et al. | 385/123 |
| 6,526,209 | B1 * | 2/2003 | Hasegawa et al. | 385/127 |
| 6,571,045 | B2 * | 5/2003 | Hasegawa et al. | 385/125 |
| 6,606,440 | B2 * | 8/2003 | Hasegawa et al. | 385/125 |
| 6,636,677 | B2 * | 10/2003 | Hasegawa et al. | 385/127 |
| 6,766,088 | B2 * | 7/2004 | Hasegawa et al. | 385/123 |
| 6,856,742 | B2 * | 2/2005 | Broeng et al. | 385/125 |
| 6,892,018 | B2 * | 5/2005 | Libori et al. | 385/127 |

(Continued)

FOREIGN PATENT DOCUMENTS

GB    2386435 A  *  9/2003

(Continued)

OTHER PUBLICATIONS

G.P. Agrawal, *Nonlinear Fiber Optics*, Second Edition, Section 2.3.1, Nonlinear Pulse Propagation, Academic Press 1995, pp. 37-43.

(Continued)

*Primary Examiner*—Michelle Connelly-Cushwa
(74) *Attorney, Agent, or Firm*—Workman Nydegger

(57) ABSTRACT

A single mode fiber is provided which is suitable for high-speed, large-capacity optical communication and for optical wiring. The single mode fiber has a first cladding region with a uniform refractive index, a core region with a refractive index higher than that of the first cladding region, and a second cladding region including at least four air hole regions placed in the first cladding region. Optimization can be achieved by making the distance from the center of the core region to the air hole regions equal to 2–4.5 times the core radius, and the air hole radius equal to or greater than 0.2 times the core radius. It is preferable the core radius be 3.7–4.8 μm, the relative index difference of the core region from the first cladding region be 0.3–0.55 %.

3 Claims, 10 Drawing Sheets

U.S. PATENT DOCUMENTS

| | | | |
|---|---|---|---|
| 2002/0118938 A1* | 8/2002 | Hasegawa et al. | 385/125 |
| 2002/0164136 A1* | 11/2002 | Fukuda et al. | 385/125 |
| 2005/0018986 A1* | 1/2005 | Argyros et al. | 385/125 |
| 2005/0238307 A1* | 10/2005 | Hansen et al. | 385/125 |
| 2006/0120677 A1* | 6/2006 | Broeng et al. | 385/125 |

FOREIGN PATENT DOCUMENTS

| | | |
|---|---|---|
| JP | 09-274118 | 10/1997 |
| JP | 11-218632 | 8/1999 |
| JP | 2000-356719 | 12/2000 |
| JP | 2001-033647 | 2/2001 |
| JP | 2001-147338 | 5/2001 |
| JP | 2004-226539 | 8/2004 |
| WO | WO 03/098296 | * 11/2003 |

OTHER PUBLICATIONS

*Characteristics of a Single-Mode Optical Fibre Cable*, ITU-T Recommendation G.652, Oct. 2000.

T. Hasegawa et al., *Modeling and Design Optimization of Hole-Assisted Lightguide Fiber by Full-Vector Finite Element Method*, Proceedings 27th European Conference on Optical Communication (ECOC 2001), pp. 324-325.

B.J. Eggleton et al., *Cladding-Mode-Resonances in Air-Silica Microstructure Optical Fibers*, Journal of Lightwave Technology, vol. 18, No. 8, Aug. 2000, pp. 1084-1100.

Bing Yao et al., *A Study of Utilization of Holey Fibers*, The Institute of Electronics, Information and Communication Engineers, Technical Report of IEICE, Jan. 2003, pp. 47-50, with English translation.

Takemi Hasegawa, *Recent Advances in Photonic Crystal Fibers and Holey Fibers*, The Institute of Electronics, Information and Communication Engineers, Technical Report of IEICE, Dec. 2001, pp. 13-18, with English translation.

Takemi Hasegawa et al., *Novel Hole-Assisted Lightguide Fiber Exhibiting Large Anomalous Dispersion and Low Loss Below 1 dB/km*, Optics & Photonics News, vol. 12, Issue 6, Jun. 2001.

Jian Zhou et al., *A Study on Bending Loss Characteristics of Hole Assisted Optical Fiber*, NTT Access Network Service Systems Laboratories, NTT Corporation, 2003, pp. 632, with English translation.

Jian Zhou et al., *Application of PCF to Optical Fiber Wiring in Residential and Business Premises*, The Institute of Electronics, Information and Communication Engineers, Technical Report of IEICE, Jan. 2003, pp. 41-46, with English translation.

* cited by examiner

HOLE-ASSISTED SINGLE MODE OPTICAL FIBER

TECHNICAL FIELD

The present invention relates to a single mode fiber suitable for high-speed, large-capacity optical communication and optical wiring, and particularly to a hole-assisted single mode optical fiber.

BACKGROUND ART

Long-distance and large-capacity optical communication using optical amplification technique has a problem of degradation in transmission characteristics due to optical nonlinear phenomena in single mode fibers.

The optical nonlinearity in a single mode fiber varies in proportion to a nonlinear coefficient n2/Aeff obtained by dividing a nonlinear refractive index n2 by an effective cross-sectional area Aeff (G. P. Agrawal, "Nonlinear Fiber Optics (second edition)", Academic Press, 1995, particularly refer to section 2.3.1, p. 42). Accordingly, the degradation in the transmission characteristics due to the optical nonlinear phenomena in the long-distance and large-capacity optical communication can be reduced by decreasing the nonlinear coefficient in the single mode fiber by increasing the effective cross-sectional area Aeff of the single mode fiber.

Thus, as for the conventional single mode fibers, attempts have been made to increase the effective cross-sectional area Aeff in the design and optimization of the refractive index profile forming the optical waveguide structure. Up to this time, in an operating wavelength region from about 1310 nm to 1625 nm, characteristics of single mode fibers with the effective cross-sectional area Aeff of about 70 $\mu m^2$ to 150 $\mu m^2$ have been disclosed (see, Japanese Patent Application Laid-open No. 9-274118 (1997) (Claim 6), Japanese Patent Application Laid-open No. 11-218632 (1999) (Claim 1), Japanese Patent Application Laid-open No. 2001-033647 (Claim 1 and a representative drawing FIG. 1), and Japanese Patent Application Laid-open No. 2001-147338 (Claim 13, paragraph [0022]), for example).

On the other hand, as for conventional 1.3 $\mu m$-band zero dispersion single mode fibers, they can be implemented with a simple two layer structure including a core region with a higher refractive index and a cladding region with a lower refractive index than the core region. Since they have a comparatively large effective cross-sectional area Aeff of about 80 $\mu m^2$ near the wavelength 1550 nm, they can achieve good connection and handling characteristics, and have been widely used in the optical communication and optical wiring until now.

The increase in the effective cross-sectional area Aeff in the design and optimization of the refractive index profile, however, will generally complicate the refractive index profile in the radial direction in a cross section of a single mode fiber (SMF). In addition, in the SMF whose effective cross-sectional area Aeff is increased, the optical confinement of the light propagating through the optical fiber within the optical core reduces, and the bending loss characteristic is deteriorated. This offers a problem in that the actual value of the feasible effective cross-sectional area Aeff is limited to a region in which the acceptable bending loss characteristic is achieved. For example, the bending loss at the bending radius 10 mm is limited to a range from 10 dB/m to 100 dB/m or less.

In addition, as for the SMF whose effective cross-sectional area Aeff is increased, the theoretical cutoff wavelength in the higher-order $LP_{11}$ mode has a tendency to shift to a longer wavelength region. This presents a problem in that the effective operating wavelength region is limited to a longer wavelength region of 1400 nm or more, for example (refer to Japanese Patent Application Laid-open No. 2001-147338 (Claim 13 and paragraph [0022], for example).

Furthermore, although the conventional SMF has a simple structure and comparatively large effective cross-sectional area Aeff, its adaptive or applicable area is limited to a region in which the bending radius is comparatively large such as from 20 mm to 30 mm because of the degradation in the bending loss characteristics. Accordingly, it has a drawback of being unable to make compact in actual optical transmission paths or optical wiring because the wiring or storage space is limited in accordance with the acceptable bending radius. Thus, to improve the bending loss characteristic of the conventional SMF, some SMFs provided for reduction of mode field diameter (MFD) have been developed. However, the SMFs of this type have a problem of impairing the handling characteristics such as the splice loss as a result of the reduction in the MFD.

DISCLOSURE OF THE INVENTION

The present invention is implemented to solve the foregoing problems. Therefore it is an object of the present invention to provide a hole-assisted single mode optical fiber that has in an operating wavelength region from 1260 nm to 1625 nm the effective cross-sectional area Aeff equal to or greater than 150 $\mu m^2$ and the bending loss characteristic equal to or less than 1 dB/m at the bending radius 10 mm, and to provide a hole-assisted single mode optical fiber that has the bending loss equal to or less than 1 dB/m at the bending radius 10 mm and the mode field diameter (MFD) from 7.9 $\mu m$ to 10.2 $\mu m$ at the wavelength 1310 nm (refer to ITU-T, recommendation G.652 (Table 1/G.652, p.6 of Revised Version in October, 2000), which is equivalent to the MFD of the conventional 1.3 $\mu m$-band zero dispersion single mode fiber (SMF).

The hole-assisted single mode optical fiber in accordance with the present invention solves the problems by comprising a first cladding region (11) with a uniform refractive index, a core region (10) with a refractive index higher than that of the first cladding region, and a second cladding region composed of a plurality of air hole regions (12) placed in the first cladding region in the surrounding region of the core region; by optimizing the radius r2 of the air hole regions and the distance d of the air hole regions from a center of the core region; and farther by optimizing the relative index difference A between the core region and the first cladding region and the core radius r1.

More specifically, to accomplish the foregoing objects, according to the present invention, there is provided a hole-assisted single mode optical fiber comprising: a first cladding region (11) having a uniform refractive index; a core region (10) with a radius r1 having a refractive index higher than that of the first cladding region (11), and placed at a center of the first cladding region (11); and a second cladding region including at least four air hole regions (12), each of which has a radius r2, is separated by a distance d from a center of the core region (10), and is placed in the first cladding region (11), wherein the distance d is 2.0 to 4.5 times the radius r1 of the core region (10), and the radius r2 of the air hole regions (12) is equal to or greater than 0.2 times the radius r1 of the core region.

The radius r1 of the core region (10) can be from 3.7 µm to 4.8 µm, and a relative index difference Δ of the core region (10) from the first cladding region (11) can be in a range from 0.3% to 0.55%.

The mode field diameter at a wavelength 1310 nm can be from 7.9 µm to 10.2 µm.

The relative index difference Δ of the core region (10) from the first cladding region (11) can be equal to or less than 0.12%, and the effective core radius A from the center of the core region (10) to the extreme circumference of the air hole regions (12) can be in a range from 23 µm to 28 µm.

According to the present invention, it becomes possible to satisfy all the characteristics of the bending loss equal to or less than 1 dB/m at the bending radius 10 mm, and the effective cross-sectional area Aeff equal to or greater than 150 µm$^2$ in a region in which the theoretical cutoff wavelength in the higher-order $LP_{11}$ mode is equal to or less than 1500 nm and the operating wavelength is from 1260 nm to 1625 nm, for example, by providing, in addition to the core region and first cladding region having the same refractive index gradient as that of a conventional single mode fiber, the second cladding region having at least four air hole regions within the first cladding region, and by optimizing the core radius r1, the relative index difference Δ of the core region, the air hole radius r2, and the distance d of the air hole regions, thereby offering a marked advantage of being able to implement the reduction in the optical nonlinearity in a wide single mode operation region.

In addition, according to the present invention, it also becomes possible for the single mode fiber with the same structure as described above to satisfy the theoretical cutoff wavelength in the higher-order $LP_{11}$ mode equal to or less than 1500 nm and the bending loss equal to or less than 1 dB/m at the bending radius 10 mm in the operating wavelength region from 1260 nm to 1625 nm, and to implement high bending loss resistance, to keep the MFD characteristics equivalent to that of the conventional SMF at the wavelength 1310 nm, and to make the variations in the MFD with reference to the conventional SMF equal to or less than ±10% even at the wavelength 1625 nm, thereby offering an advantage of being able to achieve good connection characteristics with the conventional SMF.

Furthermore, since the single mode fiber in accordance with the present invention has a structure that provides many air hole regions to a single mode fiber with a prescribed refractive index profile, it can be fabricated comparatively easier.

BRIEF DESCRIPTION OF THE DRAWINGS

FIG. 1A shows an example with four air holes, FIG. 1B shows an example with six air holes, and FIG. 1C shows an example with eight air holes;

FIG. 3A shows an example with four air holes, FIG. 3B shows an example with six air holes, and FIG. 3C shows an example with eight air holes;

BEST MODE FOR CARRYING OUT THE INVENTION

The best mode for carrying out the invention will now be described with reference to the accompanying drawings.

First Embodiment

Figure 1A:
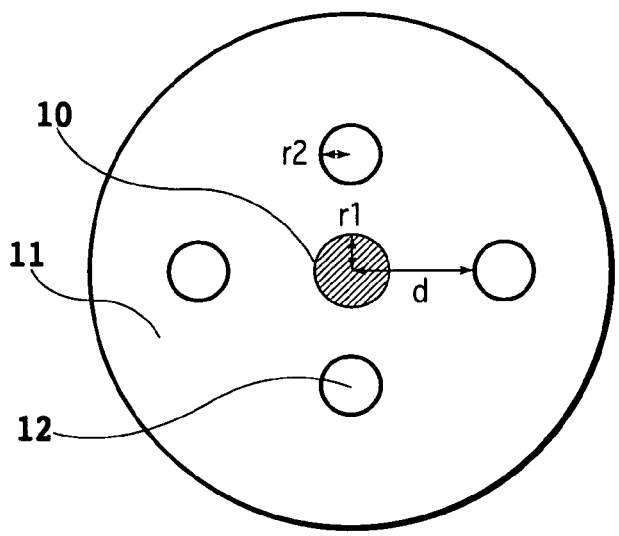
FIGS. 1A–1C are schematic cross-sectional views each showing a cross-sectional structure of a single mode fiber of an embodiment in accordance with the present invention.
Figure 1B:
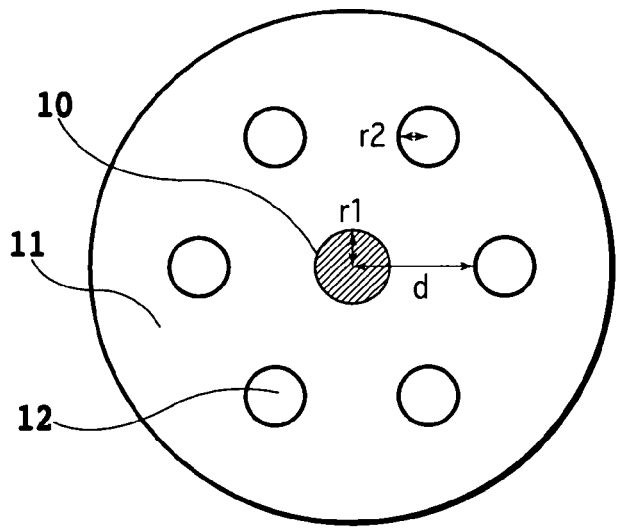
Figure 1C:
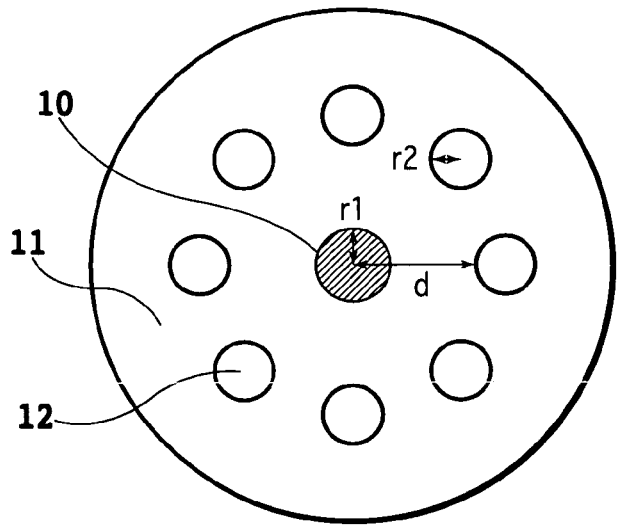

FIGS. 1A–1C are schematic cross-sectional views each showing a cross-sectional structure of an embodiment of a hole-assisted single mode optical fiber in accordance with the present invention: FIG. 1A shows an example with four air holes; FIG. 1B shows an example with six air holes; and FIG. 1C shows an example with eight air holes.

The single mode fiber in accordance with the present invention comprises a core region 10 with a radius r1, a first cladding region 11 that surrounds the core region and has a uniform refractive index, and a second cladding region including at least four air hole regions 12 that are placed at a distance d from the center of the core region 10 and have a radius r2. It is assumed that the air hole regions 12 are each formed in the longitudinal direction of the optical fiber, and are disposed separately at fixed same interval in a cross section of the optical fiber, and that their diameters are substantially constant in average throughout the longitudinal direction of the optical fiber.

The refractive index n1 of the core region 10 is adjusted by the dopant material and amount of the dopant such that the refractive index n1 becomes higher than the refractive index n2 of the first cladding region 11 as in the conventional single mode fiber. Thus, the core region 10 and first cladding region 11 constitute the major optical waveguide structure. As for the refractive index profile of the core region 10, any types of the refractive index profile as in the conventional single mode fiber are applicable.

In the embodiment in accordance with the present invention, the characteristics of the hole-assisted single mode optical fiber with a step refractive index profile will be described which is formed by setting the refractive index of the first cladding region 11 at a pure silica ($SiO_2$) level, by placing the refractive index of the second cladding region at one (air), and by doping germanium into the core region 10. Incidentally, it is also possible to design the refractive index of the core region 10 equal to or less than the refractive index of pure silica by making the refractive index of the first cladding region 11 less than that of the pure silica by doping fluorine or the like.

First, the first embodiment in accordance with the present invention will now be described by way of example which is designed in such a manner that the radius of the core region 10 (called "core radius" from now on) r1 and the relative index difference Δ of the core region 10 with respect to the first cladding region 11 each satisfy the characteristics of the conventional 1.3 μm-band zero dispersion single mode fiber (SMF).

Figure 2:
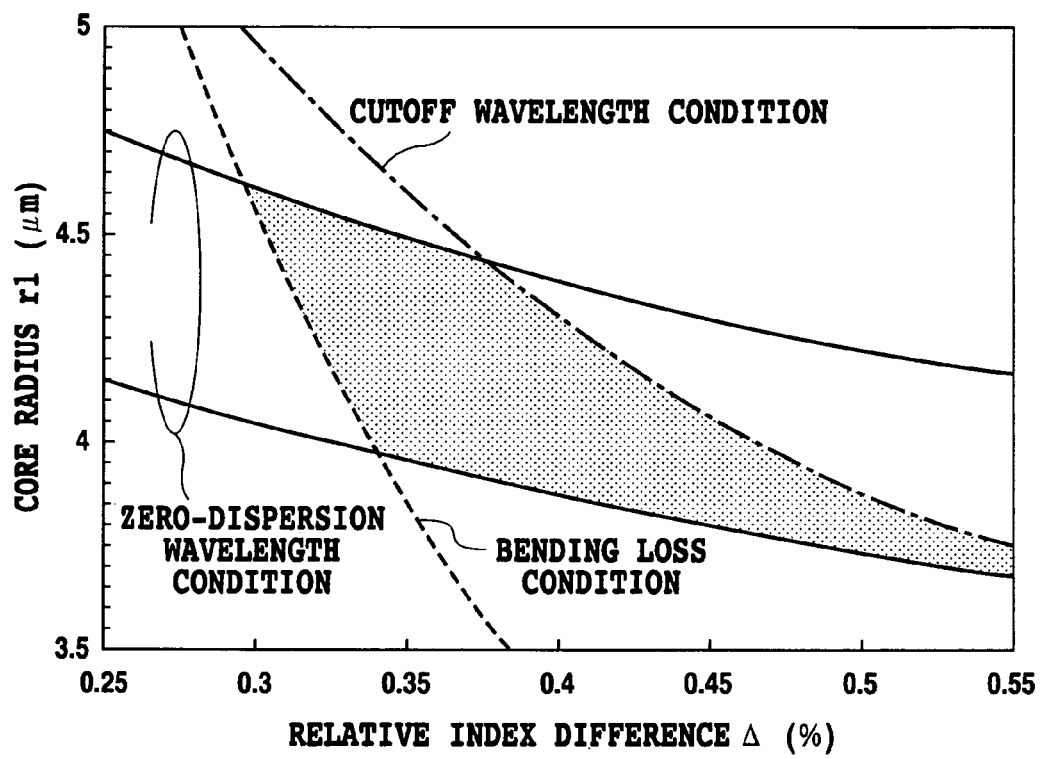
FIG. 2 is a characteristic diagram illustrating relationships between the relative index difference Δ and the core radius r1 in a conventional 1.3 µm-band zero dispersion single mode fiber, which are determined by requirements of the zero dispersion wavelength, cutoff wavelength, and bending loss characteristic.

FIG. 2 is a characteristic diagram illustrating relationships between the relative index difference Δ and the core radius r1 (design range) in a conventional SMF, which are determined by requirements of the zero dispersion wavelength, cutoff wavelength, and bending loss characteristic (refer to ITU-T, recommendation G.652 (Table 1/G.652, p. 6 of Revised Version in October, 2000). The design range is indicated as a dotted area in FIG. 2. Here, the relative index difference Δ (%) is designed by the following expression (1) using the refractive index n1 of the core region 10 and the refractive index n2 of the cladding region (the first cladding region 11 in the structure in accordance with the present invention).

$$\Delta = \frac{n1^2 - n2^2}{2n1^2} \times 100 \quad (1)$$

FIG. 2 shows that the requirements of the conventional SMF can be satisfied by designing in such a manner that the radius r1 of the core region 10 is in a range from about 3.7 μm to 4.8 μm, and the relative index difference Δ is in a range from about 0.3% to 0.55%.

Figure 3A:
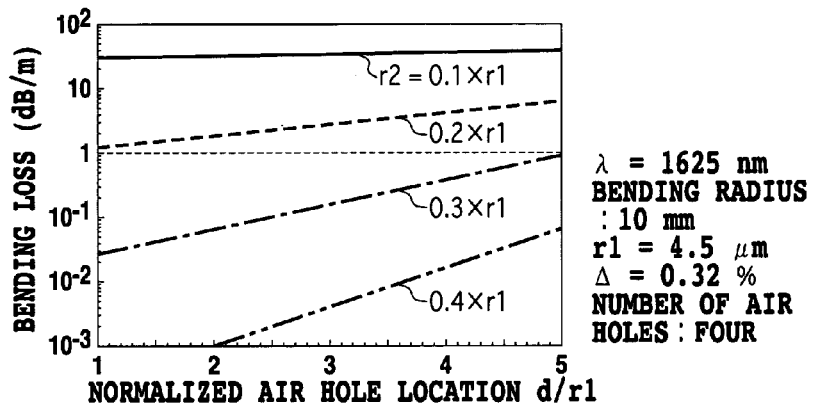
FIGS. 3A–3C are characteristic diagrams each illustrating relationships between the normalized air hole distance d/r1 and the bending loss of a hole-assisted single mode optical fiber in an embodiment in accordance with the present invention.
Figure 3B:
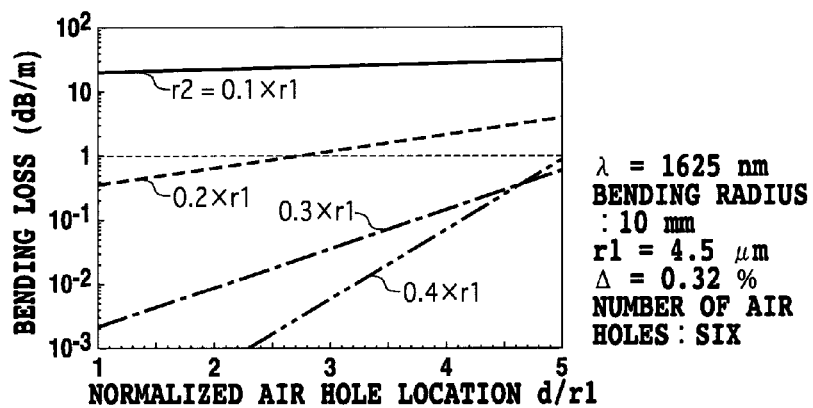
Figure 3C:
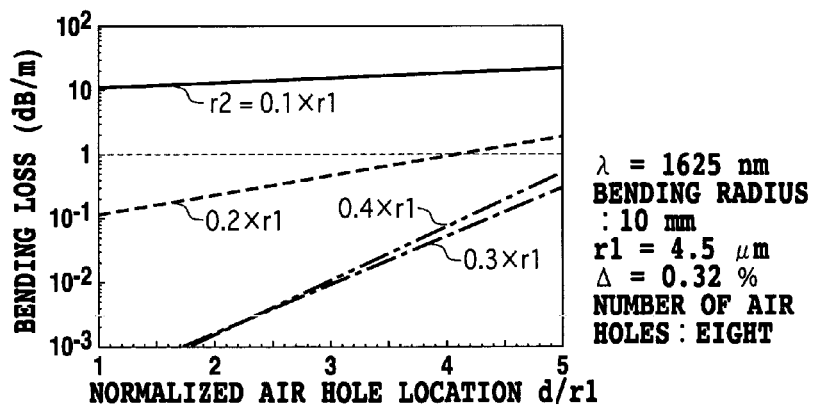

FIGS. 3A–3C are characteristic diagrams illustrating relationships between the normalized air hole distance d/r1 and the bending loss characteristic at the bending radius 10 mm at wavelength 1625 nm using the radius of the air hole regions (called "air hole radius" from now on) r2 as a parameter. In the example of FIGS. 3A–3C, the relative index difference Δ is made 0.32%, and r1 is made 4.5 μm from the relationships as illustrated in FIG. 2.

Here, FIG. 3A shows a characteristic example in which the number of the air hole regions 12 (called "air hole number" from now on) is four, FIG. 3B shows a characteristic example with six air holes, and FIG. 3C shows a characteristic example with eight air holes.

Generally, the mode field diameter (MFD) of the single mode fiber increases more and more in the longer wavelength region, and in connection with this, the bending loss characteristic tends to degrade in the longer wavelength region. Accordingly, in the hole-assisted single mode optical fiber with the number of air holes being four, six or eight as shown in FIGS. 3A–3C, the bending loss characteristic at the bending radius 10 mm can be made equal to or less than 1 dB/m in a wavelength range equal to or less than 1625 nm by making the design within the parameters of the air hole radius r2 is about 0.2 times the core radius r1 or more, and the air hole distance d is about 4.5 times the core radius r1 or less.

Figure 4:
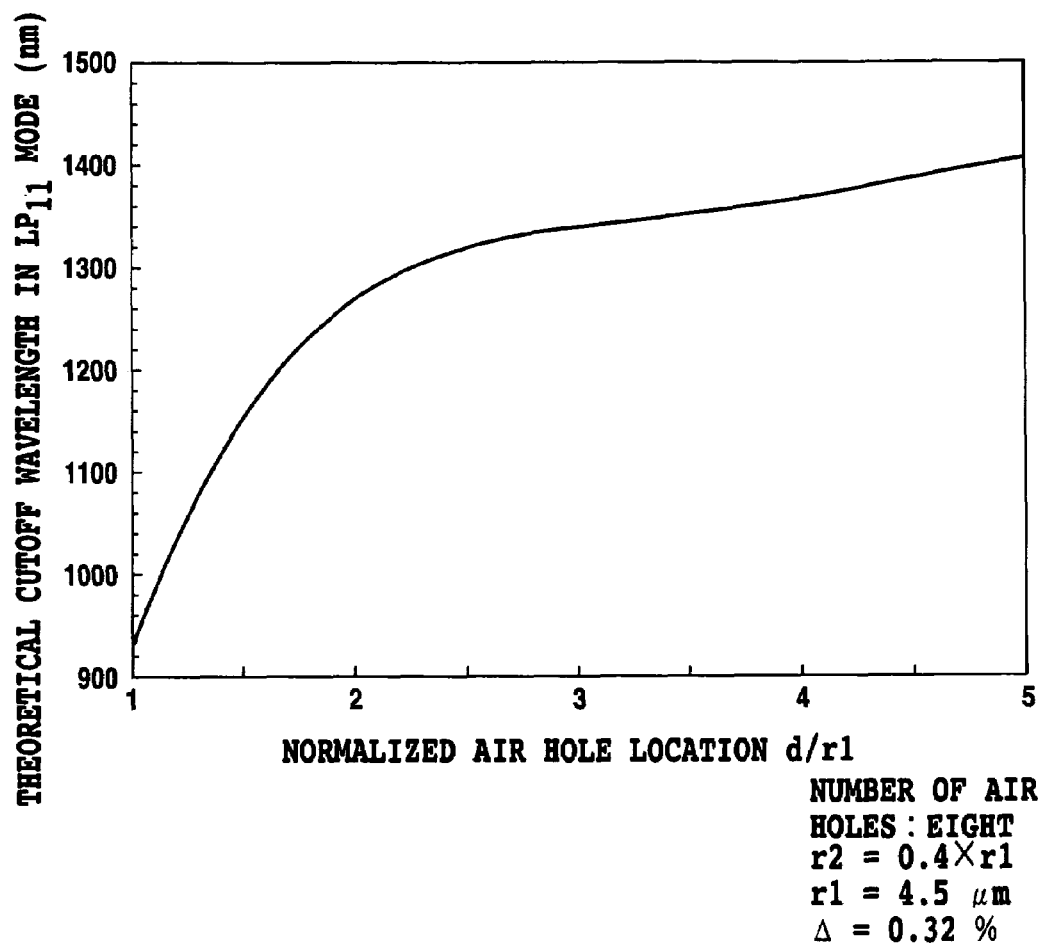
FIG. 4 is a characteristic diagram illustrating relationships between the normalized air hole distance d/r1 and the theoretical cutoff wavelength in the higher-order $LP_{11}$ mode of a hole-assisted single mode optical fiber of a first embodiment in accordance with the present invention.

FIG. 4 is a diagram illustrating relationships between the normalized air hole distance d/r1 and the theoretical cutoff wavelength in the higher-order $LP_{11}$ mode of a hole-assisted single mode optical fiber in which the number of air holes is eight, and the air hole radius r2 is 0.4 times the core radius r1. The theoretical cutoff wavelength in the higher-order $LP_{11}$ mode of the foregoing conventional SMF whose relative index difference Δ is 0.32% and the core radius r1 is 4.5 μm is about 1450 nm. The hole-assisted single mode optical fiber in accordance with the present invention can also achieve the cutoff wavelength characteristic equivalent to that of the conventional SMF or less as illustrated in FIG. 4.

Figure 5:
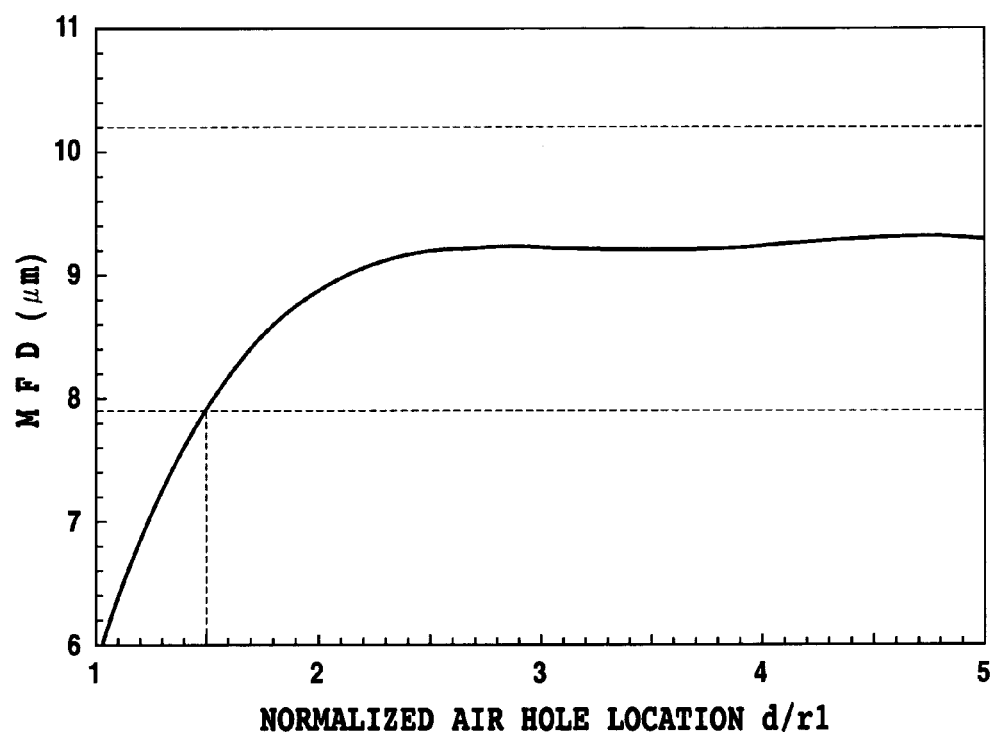
FIG. 5 is a characteristic diagram illustrating variations in the MFD versus normalized air hole distance d/r1 at the wavelength 1310 nm of the hole-assisted single mode optical fiber in the first embodiment in accordance with the present invention.

FIG. 5 is a diagram illustrating variations in the MFD (mode field diameter) versus the normalized air hole distanced/r1 at the wavelength 1310 nm of the hole-assisted single mode optical fiber with the same conditions as those shown in FIG. 4 in the number of air holes and all. As illustrated in FIG. 5, the optical fiber can achieve the MFD characteristic from about 7.9 μm to 10.2 μm, which is equivalent to that of the conventional SMF, by making the design in the range in which the normalized air hole distance d/r1 is about 1.5 or more.

Figure 6:
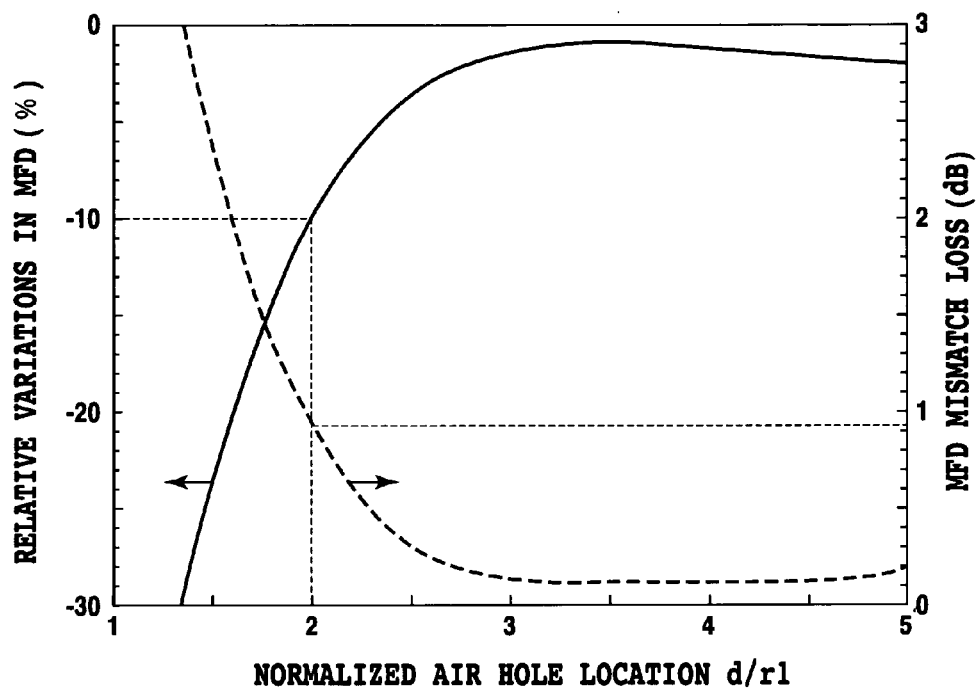
FIG. 6 is a characteristic diagram illustrating relationships of the relative variations in the MFD and of the splice loss due to the mismatch of the MFD with reference to a conventional SMF versus normalized air hole distance d/r1 at the wavelength 1625 nm of the hole-assisted single mode optical fiber of the first embodiment in accordance with the present invention.

FIG. 6 is a characteristic diagram illustrating relative variations in the present MFD of the hole-assisted single mode optical fiber with reference to the MFD of the conventional SMF and the splice loss due to the mismatch of the MFD versus the normalized air hole distance d/r1 at the wavelength 1625 nm. Here, the solid curve represents the characteristics of the relative variations in the MFD, and the dotted curve represents the characteristics of the MFD mismatch loss. As illustrated in FIG. 6, making the design in the range in which the normalized air hole distance d/r1 is 2.0 or more enables the relative variations in the MFD involved in providing the air hole regions 12 to be equal to or less than ±10% with reference to the MFD of the conventional SMF at the wavelength 1625 nm, and to enable the splice loss due to the mismatch of the MFD to be less than 1 dB.

Therefore, it is possible to achieve the characteristics that enable the relative variations in the present MFD with reference to the MFD of the conventional SMF to be curbed equal to or less than ±10% even at the upper limit 1625 nm of the operating wavelength by making the theoretical cutoff wavelength in the higher-order $LP_{11}$ mode equal to or less than 1500 nm, by making the bending loss characteristic at the bending radius 10 mm equal to or less than 1 dB/m in the operating wavelength region from 1260 nm to 1625 nm, and by making the MFD at the wavelength 1310 nm from about 7.9 μm to 10.2 μm which is equivalent to that of the conventional SMF by making the design of the hole-assisted single mode optical fiber in accordance with the present invention, which has at least four air hole regions 12 as shown in FIGS. 2, 3A–3C, 4, 5 and 6, in the range in which the distance d of the air hole regions 12 is 2.0–4.5 times the core radius r1, the radius r2 of the air hole regions 12 is 0.2 times the core radius r1 or more, the relative index difference Δ of the core region 10 is about 0.3% to 0.55%, and the core radius r1 is about 3.7 μm to 4.8 μm.

Figure 7:
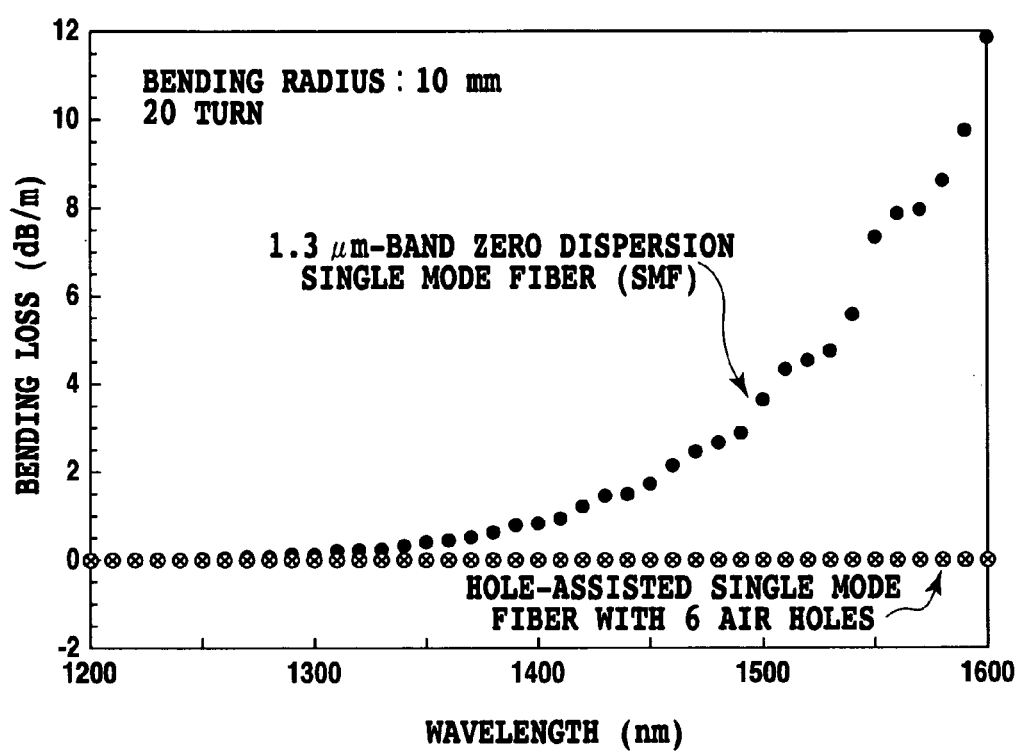
FIG. 7 is a characteristic diagram illustrating measurement results of the wavelength characteristics of the bending loss in the hole-assisted single mode optical fiber with six air holes fabricated according to the first embodiment in accordance with the present invention.

FIG. 7 is a diagram illustrating measurement results of the wavelength characteristics of the bending loss in two types of hole-assisted single mode optical fibers with six air hole regions 12 which were fabricated experimentally on the basis of the embodiment in accordance with the present invention in comparison with the conventional SMF. The measurement conditions of the bending loss were that the bending radius was 10 mm with 20 turns. In FIG. 7, solid circles represent the characteristics of the conventional SMF, and circles with X represent the characteristics of the hole-assisted SMF in accordance with the present invention. The bending loss of the prototype hole-assisted single mode optical fiber in the measurement wavelength region is equal to or less than measurement minimum limit of 0.01 dB/m. In particular, the bending loss reduction effect of two orders of magnitude higher than the conventional SMF is achieved in the longer wavelength region.

Second Embodiment

Next, as the second embodiment in accordance with the present invention, an example will be described in which the effective cross-sectional area Aeff is increased by optimizing the relative index difference Δ of the core region 10 and the core radius.

Figure 8:
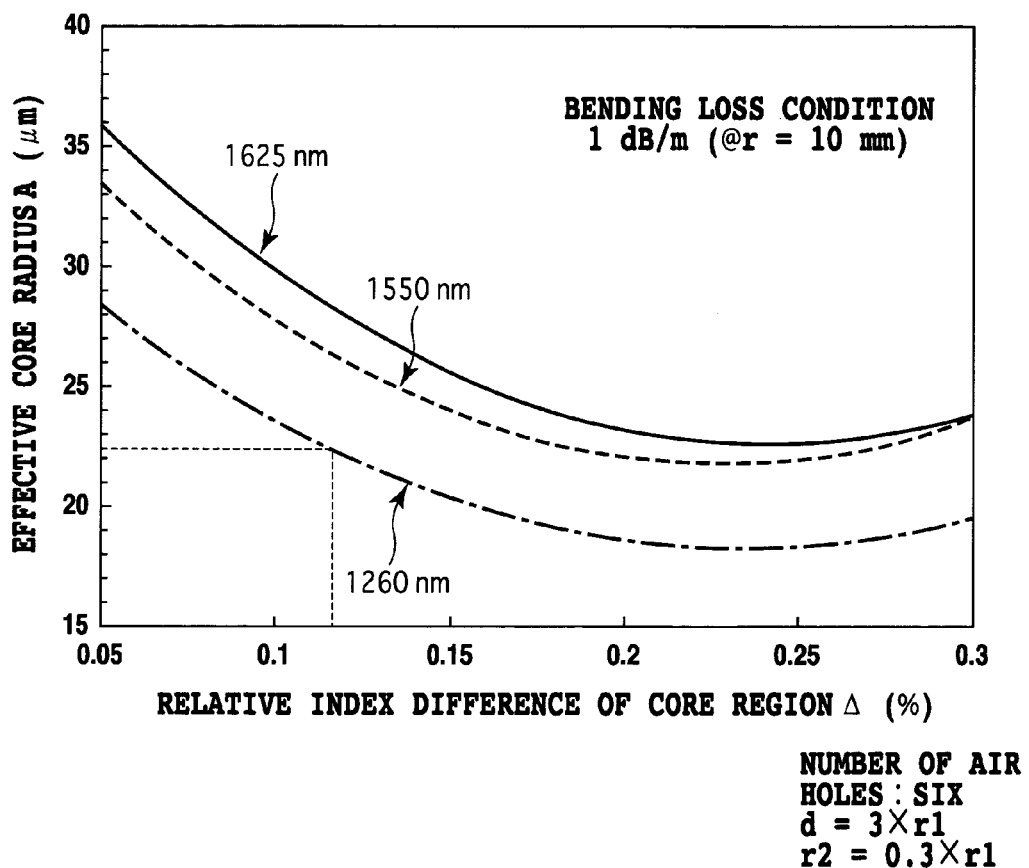
FIG. 8 is a characteristic diagram illustrating relationships between the relative index difference Δ in the core region and the effective core radius A of a hole-assisted single mode optical fiber in a second embodiment in accordance with the present invention.

FIG. 8 is a diagram illustrating relationships between the relative index difference Δ of the core region 10 from the refractive index of the first cladding region 11 and the effective core radius A, in which the bending loss at the bending radius 10 mm is equal to or less than 1 dB/m. Here, the effective core radius A is defined as the distance from the center of the core region 10 to the extreme circumference of the second cladding region, which is equal to A=d+2×r2 (see, FIGS. 1A–1C). As an example, the number of the air hole regions 12 constituting the second cladding region is six, the air hole radius r2 is 0.3 times the core radius r1, and the air hole distance d is three times the core radius r1.

FIG. 8 shows that the bending loss at the bending radius 10 mm can be made equal to or less than 1 dB/m in the operating wavelength range from 1260 nm to 1625 nm by designing using the relationships between relative index difference Δ and the effective core radius A at the wavelength 1260 nm.

Figure 9:
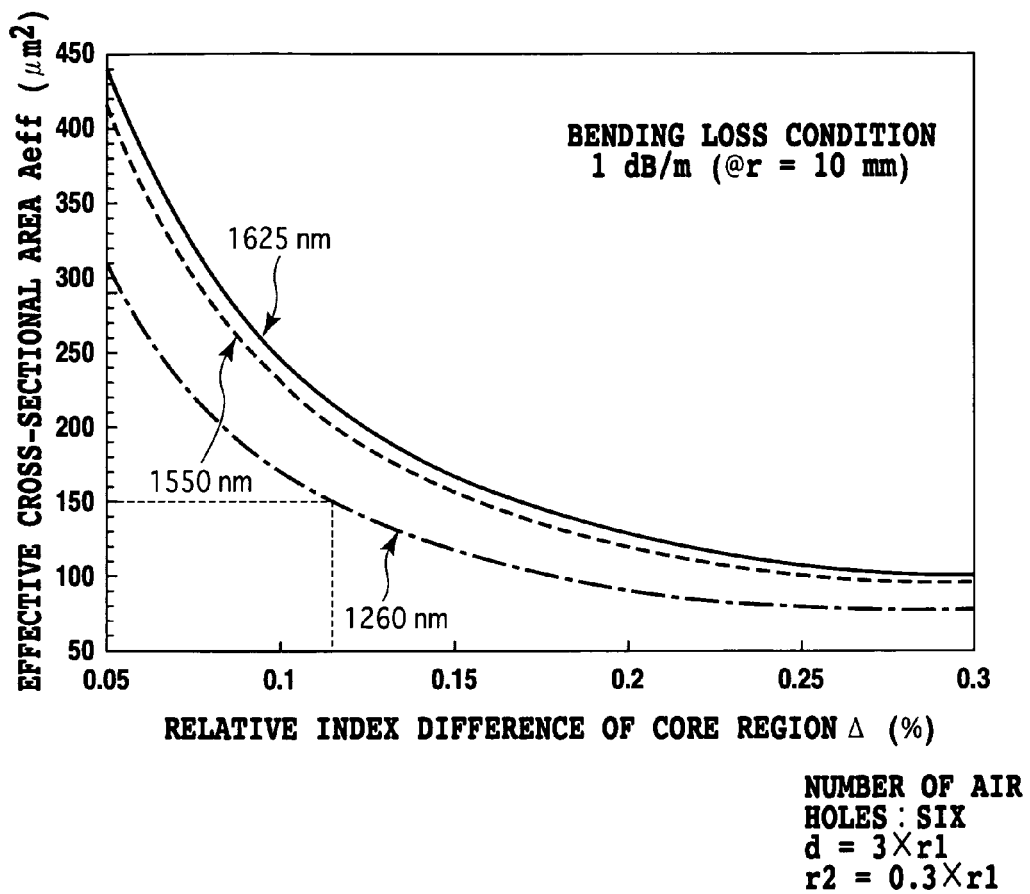
FIG. 9 is a characteristic diagram illustrating relationships between the relative index difference Δ in the core region and the effective cross-sectional area Aeff of the hole-assisted single mode optical fiber in the second embodiment in accordance with the present invention.

FIG. 9 is a diagram illustrating relationships between the relative index difference Δ of the core region 10 and the effective cross-sectional area Aeff at the wavelength 1260 nm, 1550 nm and 1625 nm when using the relationships between the relative index difference Δ and the effective core radius A at the wavelength 1260 nm of FIG. 8.

Figure 10:
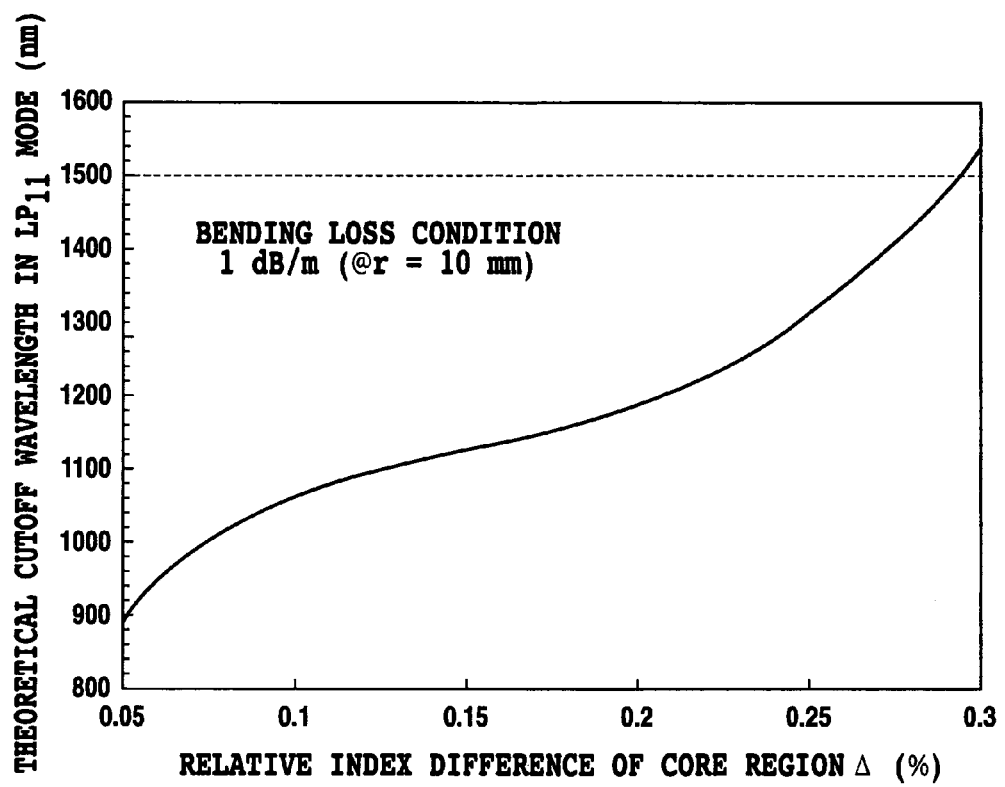
FIG. 10 is a characteristic diagram illustrating relationships between the relative index difference Δ in the core region and the theoretical cutoff wavelength in the higher-order $LP_{11}$ mode of the hole-assisted single mode optical fiber in the second embodiment in accordance with the present invention.

In addition, FIG. 10 is a diagram illustrating relationships between the relative index difference Δ of the core region 10 and the theoretical cutoff wavelength in the higher-order $LP_{11}$ mode when using the relationships between the relative index difference Δ and the effective core radius A at the wavelength 1260 nm of FIG. 8.

Therefore, as shown in FIGS. 8, 9 and 10, it is possible for the second embodiment in accordance with the present invention, in the single mode fiber with six air hole regions 12 which are placed at the distance d=3×r1 from the center of the core region 10 and have the radius r2=0.3×r1, to achieve the characteristics that enable the effective cross-sectional area Aeff in the wavelength range from 1260 nm to 1625 nm to be equal to or greater than 150 μm2, and the bending loss at the bending radius 10 mm to be equal to or less than 1 dB/m by making the theoretical cutoff wavelength in the higher-order $LP_{11}$ mode equal to or less than 1100 nm by making the design in the range in which the relative index difference Δ of the core region 10 is equal to or less than about 0.12%, and the effective core radius A is about from 23 μm to 28 μm.

Other Embodiments

Although the preferred embodiments in accordance with the present invention have been described by way of example, the embodiments in accordance with the present invention are not limited to the foregoing examples. As long as they are within the scope of appended claims, substitutes, modifications, revisions, additions, increase or decrease of the number, and changes in shapes of the components all fall within the range of the embodiment in accordance with the present invention. For example, the number of the air hole regions 12, the materials of the optical fiber, and the like in accordance with the present invention are not limited to those described in the foregoing embodiments. The optical fiber can be formed not only by glass, but also by any transparent media in the used wavelength such as plastics. In addition, although the air hole regions 12 are preferably cylindrical, elliptical or polygonal holes very close to cylindrical holes are also applicable. Furthermore, the internal space of the air hole regions 12 is not limited to a vacuum. For example, they may be filled with a gas, liquid, or solid which is transparent at the used wavelength, and has a refractive index lower than that of the first cladding region 11.

What is claimed is:

1. A hole-assisted single mode optical fiber comprising:
   a first cladding region having a uniform refractive index;
   a core region with a radius r1 having a refractive index higher than that of said first cladding region, and placed at a center of said first cladding region; and
   a second cladding region including at least four air hole regions, each of which has a radius r2, is separated by a distance d from a center of said core region, and is placed in said first cladding region, wherein
   the distance d is 2.0 to 4.5 times the radius r1 of said core region, and the radius r2 of said air hole regions is equal to or greater than 0.2 times the radius r1 of said core region, and wherein
   said hole-assisted single mode optical fiber has zero-dispersion wavelength characteristics in a range from 1300 nm to 1324 nm, and has a bending loss characteristics equal to or less than 1 dB/m at a bending radius 10 mm, and variations in a mode field diameter by providing said air hole regions is equal to or less than ±10%.

2. The hole-assisted single mode optical fiber as claimed in claim 1 wherein the radius r1 of said core region is from 3.7 μm to 4.8 μm, and a relative index difference Δ of said core region from said first cladding region is in a range from 0.3% to 0.55%.

3. A hole-assisted single mode optical fiber comprising:
   a first cladding region having a uniform refractive index;
   a core region with a radius r1 having a refractive index higher than that of said first cladding region, and placed at a center of said first cladding region; and a second cladding region including at least four air hole regions, each of which has a radius r2, is separated by a distance d from a center of said core region, and is placed in said first cladding region, wherein a relative index difference Δ of said core region from a refractive index of said first cladding region is in a range from 0.05% to 0.12%, an effective core radius A from the center of said core region to an extreme circumference of said air hole regions is in a range from 23 μm to 28 μm, and wherein said hole-assisted single mode optical fiber has a theoretical cutoff wavelength characteristics equal to or less than 1100 nm, a bending loss equal to or less than 1 dB/m at a bending radius 10 mm, and effective cross-sectional area characteristics equal to or greater than 150 μm$^2$ in a wavelength range from 1260 nm to 1625 nm.

* * * * *